(12) United States Patent
Wildman et al.

(10) Patent No.: US 8,360,438 B2
(45) Date of Patent: Jan. 29, 2013

(54) SEAL

(75) Inventors: Eric Wildman, Bristol (GB); Simon John Parker, Bristol (GB)

(73) Assignee: Airbus Operations Limited, Bristol (GB)

( * ) Notice: Subject to any disclaimer, the term of this patent is extended or adjusted under 35 U.S.C. 154(b) by 0 days.

(21) Appl. No.: 12/737,705

(22) PCT Filed: Aug. 25, 2009

(86) PCT No.: PCT/GB2009/051057
§ 371 (c)(1),
(2), (4) Date: Feb. 8, 2011

(87) PCT Pub. No.: WO2010/023475
PCT Pub. Date: Mar. 4, 2010

(65) Prior Publication Data
US 2011/0133411 A1    Jun. 9, 2011

(30) Foreign Application Priority Data
Sep. 1, 2008   (GB) .................................. 0815778.6

(51) Int. Cl.
*F16J 15/14* (2006.01)
(52) U.S. Cl. ...................................................... 277/651
(58) Field of Classification Search ................ 277/500, 277/628, 635, 634, 651, 650, 630, 640, 554, 277/555; 60/232; 239/265.35
See application file for complete search history.

(56) References Cited

U.S. PATENT DOCUMENTS

| | | | |
|---|---|---|---|
| 3,999,930 A | 12/1976 | Telbizoff | |
| 5,824,249 A * | 10/1998 | Leitch et al. | .................. 264/219 |
| 5,897,120 A | 4/1999 | Scavo et al. | |
| 2003/0066933 A1 | 4/2003 | Maury et al. | |
| 2006/0249627 A1 | 11/2006 | Hernandez et al. | |

FOREIGN PATENT DOCUMENTS

| | | |
|---|---|---|
| FR | 2 569 455 | 2/1986 |
| FR | 2 789 144 | 8/2000 |

OTHER PUBLICATIONS

UK Search Report for GB No. 0815778.6, dated Nov. 3, 2008.
International Search Report for PCT/GB2009/051057, mailed Apr. 29, 2010.
Written Opinion of the International Searching Authority for PCT/GB2009/051057, mailed Apr. 29, 2010.

* cited by examiner

*Primary Examiner* — Gilbert Lee
(74) *Attorney, Agent, or Firm* — Nixon & Vanderhye P.C.

(57) ABSTRACT

A seal (500) comprises a seal body (502) having a mounting portion (504), a first leg (506) and a second leg (508), a first stiffening member (514) and a second stiffening member (516) separated by an arcuate shear seal portion (529) in which the motions of the first leg (506) and second leg (508) are relatively constrained by the second stiffening member (516).

11 Claims, 8 Drawing Sheets

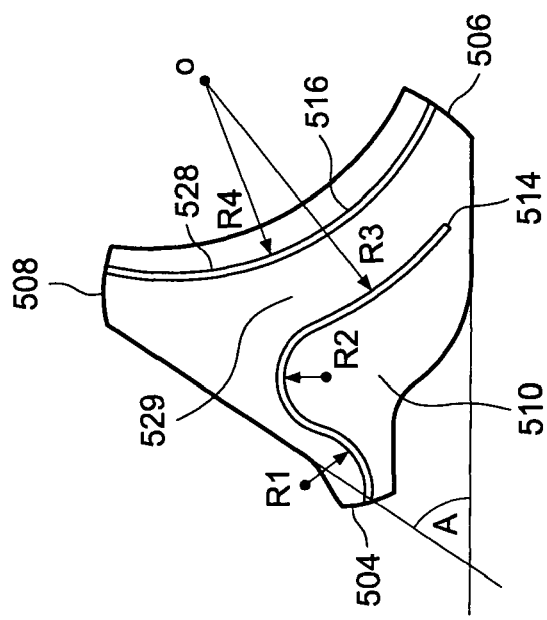
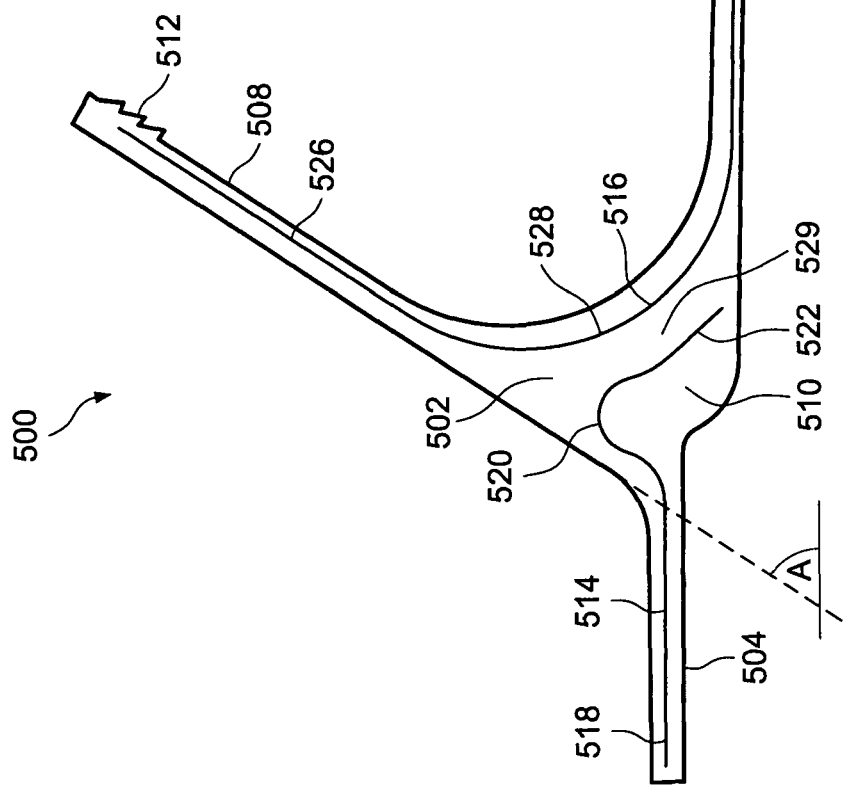
FIG. 5b
FIG. 5a

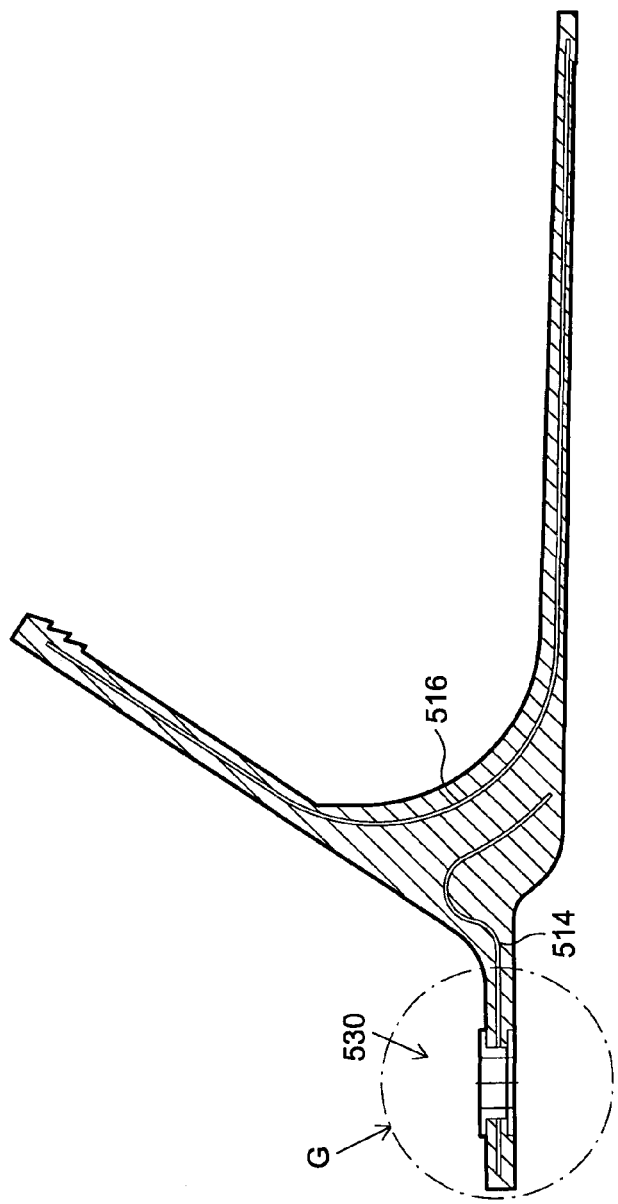
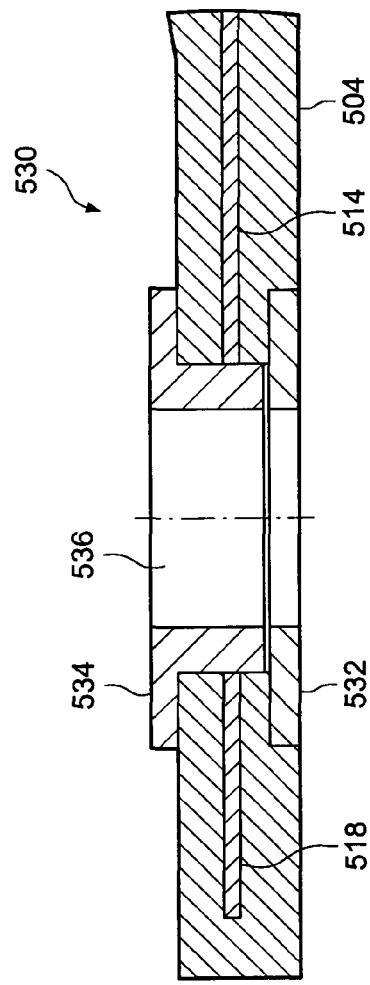
FIG. 5f
FIG. 5g ns of an aircraft to seal a variable gap therebetween.
SEAL This application is the U.S. national phase of International Application No. PCT/GB2009/051057, filed 25 Aug. 2009, which designated the U.S. and claims priority to GB Application No. 0815778.6, filed 1 Sept. 2008, the entire contents of each of which are hereby incorporated by reference.

FIELD OF THE INVENTION

The present invention is concerned with a flight surface seal. More particularly, the present invention is concerned with a seal positioned between two control surface components of an aircraft to seal a variable gap therebetween.

BACKGROUND OF THE INVENTION

In aerospace design it is desirable to seal any gaps between components of flight surfaces to present a smooth surface to the passing airflow. This reduces losses and prevents undesirable fluid flow effects such as separation of the boundary layer and subsequent loss of lift, and prevents leakage over the pressure differential between the upper and lower surfaces of aerofoils.

Components of aircraft flight surfaces such as wings, tail planes, fins, landing gear doors and control surfaces (e.g. flaps, slats, rudders, ailerons and spoliers) tend to move in use both intentionally in response to a control input (in the case of control surfaces) and unintentionally due to thermal expansion and contraction and stresses experienced in use.

As such, the width of the gaps to be sealed between components varies depending on the relative position of the components. Known seal technology utilises resilient seals which are mounted to a first component to seal against a second adjacent component and resiliently deform to the seal gap as it varies.

Such gap width variation is observed between variable camber flaps at the trailing edge of aircraft wings. The gap width between the wing and the flap not only changes due to control input, but also changes as the wing and flap thermally expand and contract with variations in operating temperature and during the flight cycle during which a range of stresses are experienced.

A λ or V shaped seal has been proposed in which the flap is received within the legs of the λ or V. A problem with this type of seal is that the individual legs flex independently and as such can spread and deform with little inherent structural stiffness. Consequently phenomena such as seal flutter can be observed in which one of the legs of the seal is detached (i.e. separated or divorced) from the flap underside.

It is an aim of the present invention to provide an improved flight surface seal.

SUMMARY OF THE INVENTION

According to a first aspect of the present invention there is provided a flight surface seal for sealing a gap between a first and a second component of an aircraft flight surface, the seal having a seal body comprising a mounting portion for mounting to the first component, a first leg and a second leg projecting from the mounting portion and spaced apart to receive the second component therebetween, wherein the seal further comprises a first stiffening member configured to at least partially constrain the relative motion of the first and second legs.

According to a second aspect of the invention there is provided a method of manufacture of an aircraft flight surface seal comprising the steps of:
providing a mould,
providing at least one stiffening member within the mould,
inserting a sealing material into the mould to at least partially surround the stiffening member,
curing the sealing material,
removing the seal from the mould.

BRIEF DESCRIPTION OF THE DRAWINGS

An example seal will now be described with reference to the accompanying figures in which.

DETAILED DESCRIPTION OF THE PREFERRED EMBODIMENT

Figure 1:
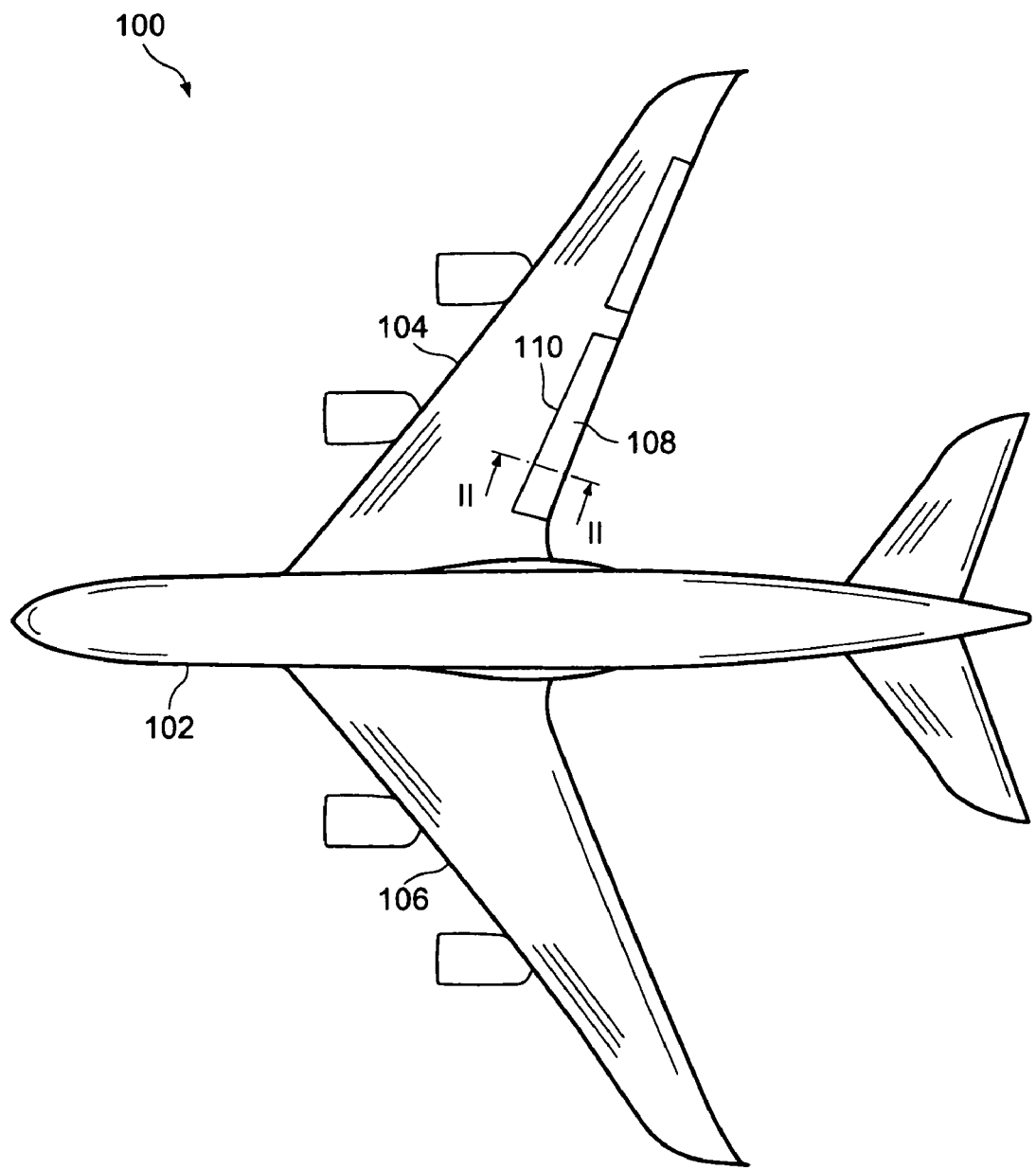
FIG. 1 is a plan view of an aircraft.

Referring to FIG. 1, an aircraft 100 comprises a fuselage 102 and wings 104, 106. The wing 104 comprises a flap 108 positioned at a wing trailing edge lower panel trailing edge 110. The flap 108 can be moved to alter the aerodynamic characteristics of the wing 104.

Figure 2:
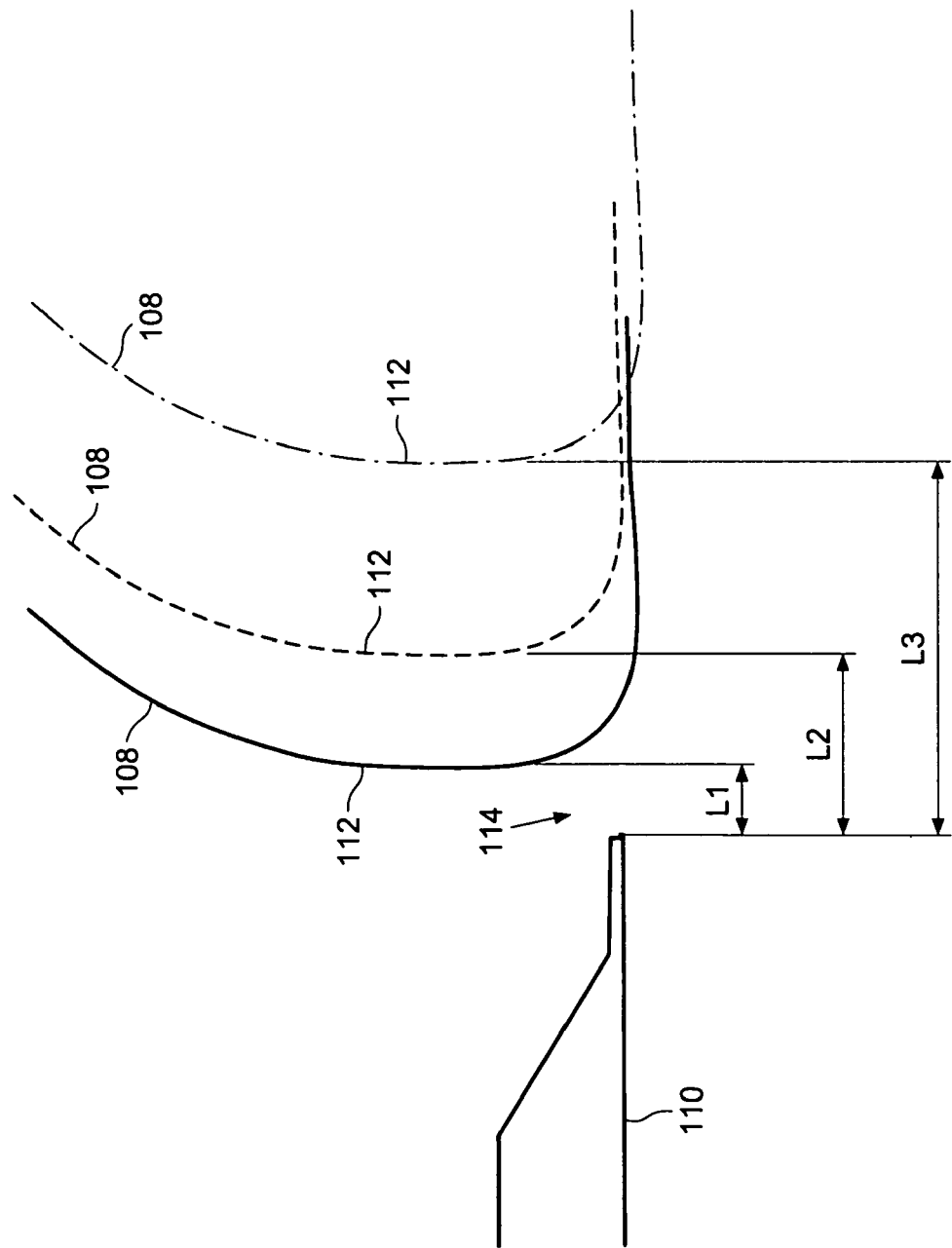
FIG. 2 is a side section view along II-II in FIG. 1 of a range of motion of a flap.

Referring to FIG. 2, a leading edge 112 of the flap 108 is shown in a variety of operational positions relative to the wing trailing edge 110. The flap 108 describes an arcuate motion in use, and as can be seen the distance between the leading edge 112 of the flap 108 and the trailing edge 110 varies considerably (L1, L2, L3). It should also be noted that the vertical position of the flap 108 also varies with respect to the trailing edge 110 however this is small compared to the horizontal motion depicted by L1, L2, L3. A variable gap 114 therefore exists between the leading edge 112 of the flap 108 and the trailing edge 110 of the wing 104.

Figure 3:
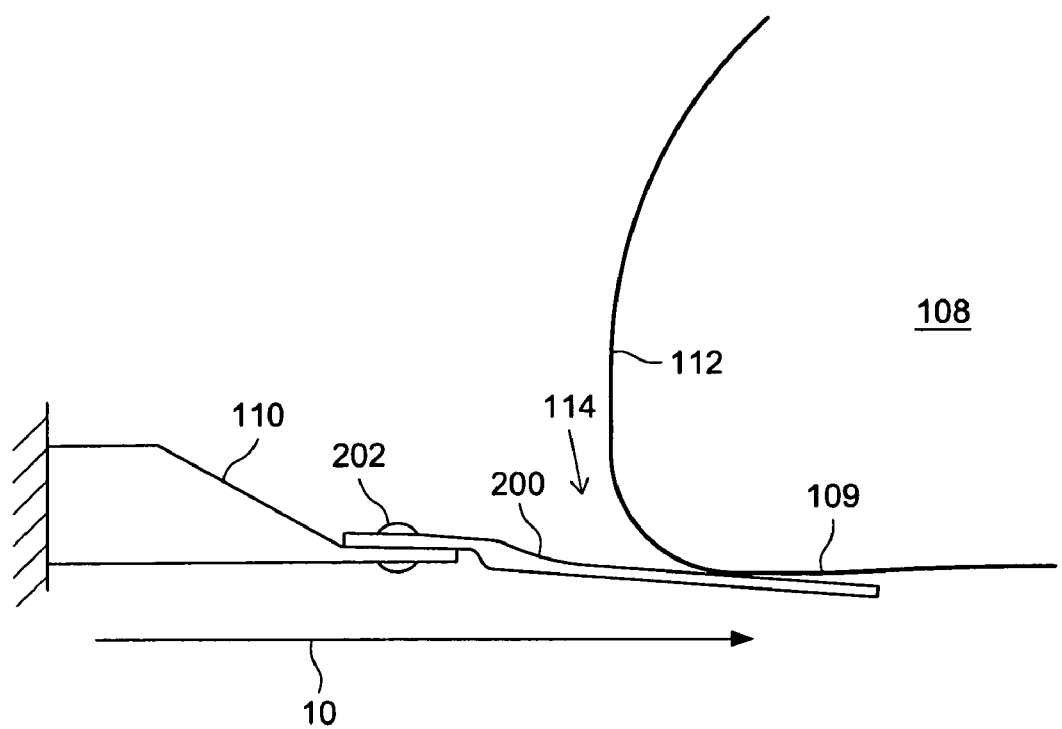
FIG. 3 is a side section view of a first known flap seal.

It is desirable to seal the gap 114 for aerodynamic reasons. Referring to FIG. 3, a substantially flat seal 200 as known in the art is attached to the trailing edge 110 via a fastener 202. The flat seal is constructed from an elastomeric sealing material and contacts the flap 108 at a lower surface 109 of the flap 108. The seal 200 is deformed slightly by virtue of its contact with the flap 108 and as such resiliently presses against the surface 109.

Although this contact seals the gap 114 when static, forces on the flap experienced by an airstream 10 can peel the seal 200 from the surface 109 and make it "flutter". This is undesirable as air can then pass through the gap 114. It should also be noted that the seal 200 is less effective as the flap 108 moves away from the edge 110 as the amount of force with which it abuts the surface 109 decreases (its inherent structural stiffness is less).

Figure 4A:
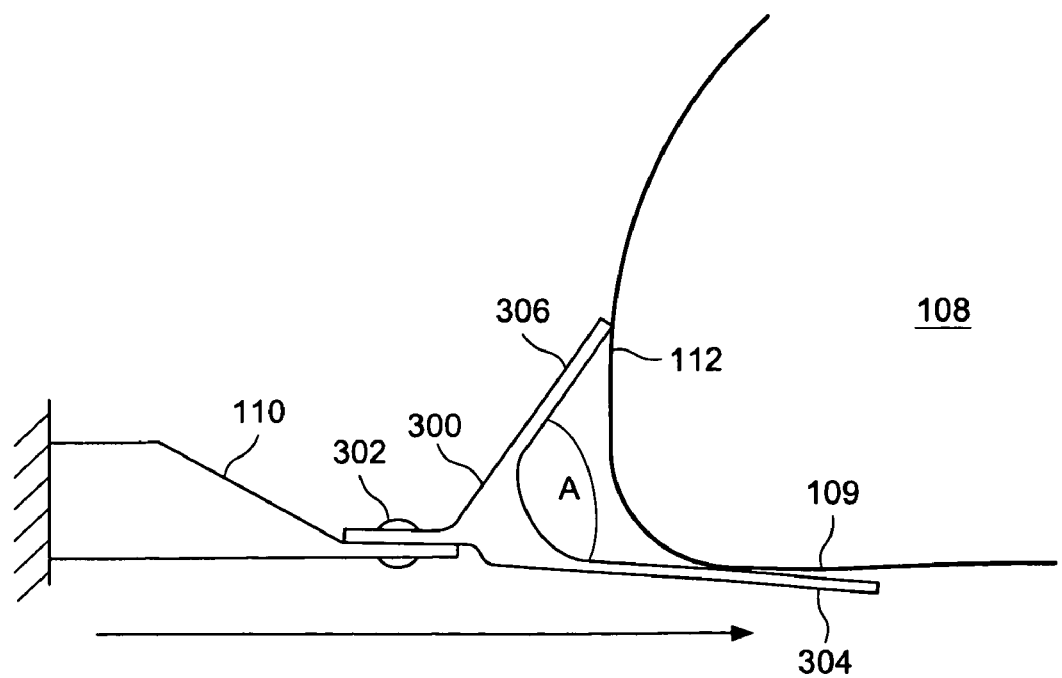
FIG. 4a is a side section view of a second known flap seal.

Referring to FIG. 4a a known seal 300 is shown comprising attachment means 302, a first leg 304 projecting parallel to the edge 110 and a second leg 306 projecting in the same direction but at an angle A of approximately 45 degrees to the first leg. The first leg 304 abuts the surface 109 of the flap 108 and the second leg 306 abuts the leading edge 112 of the flap 108.

Figure 4B:
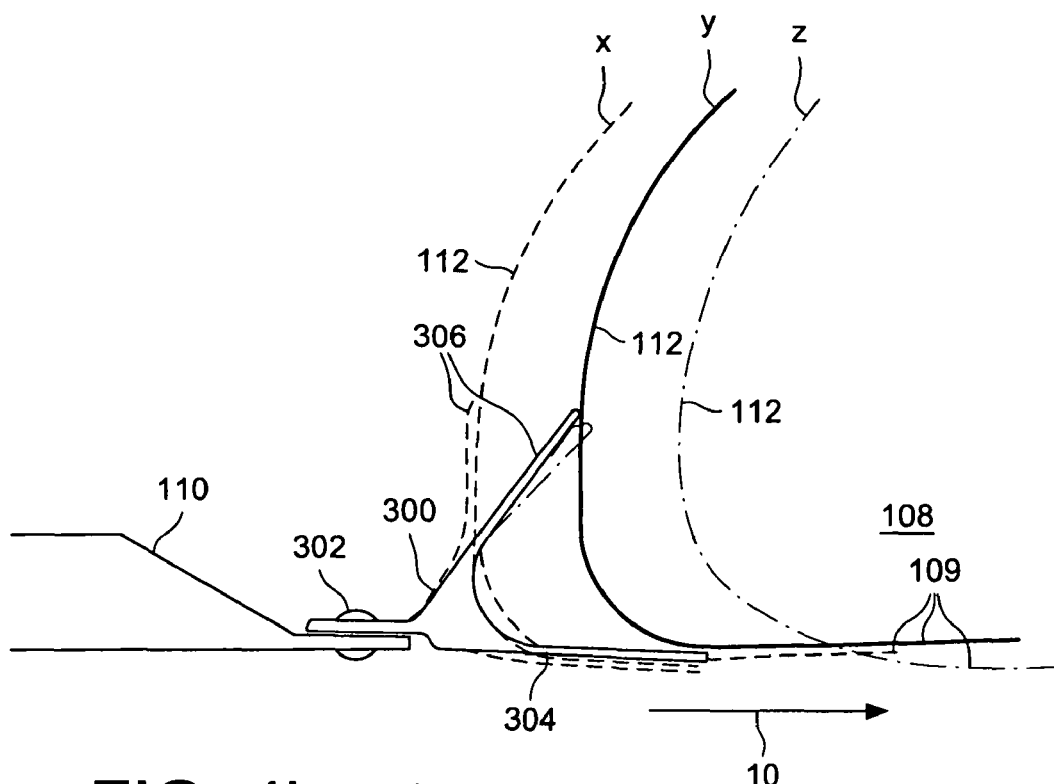
FIG. 4b is side section view of the flap seal of FIG. 4a in a deformed and an undeformed state.

Referring to FIG. 4b, three flap positions X, Y, Z are shown. As can be observed, in positions X and Y the second leg 306 is abutting the leading edge 112 of the flap 108 to provide an auxiliary seal against ingress of the airstream 10. As will be noted in position Z, no auxiliary seal is provided.

Figure 4C:
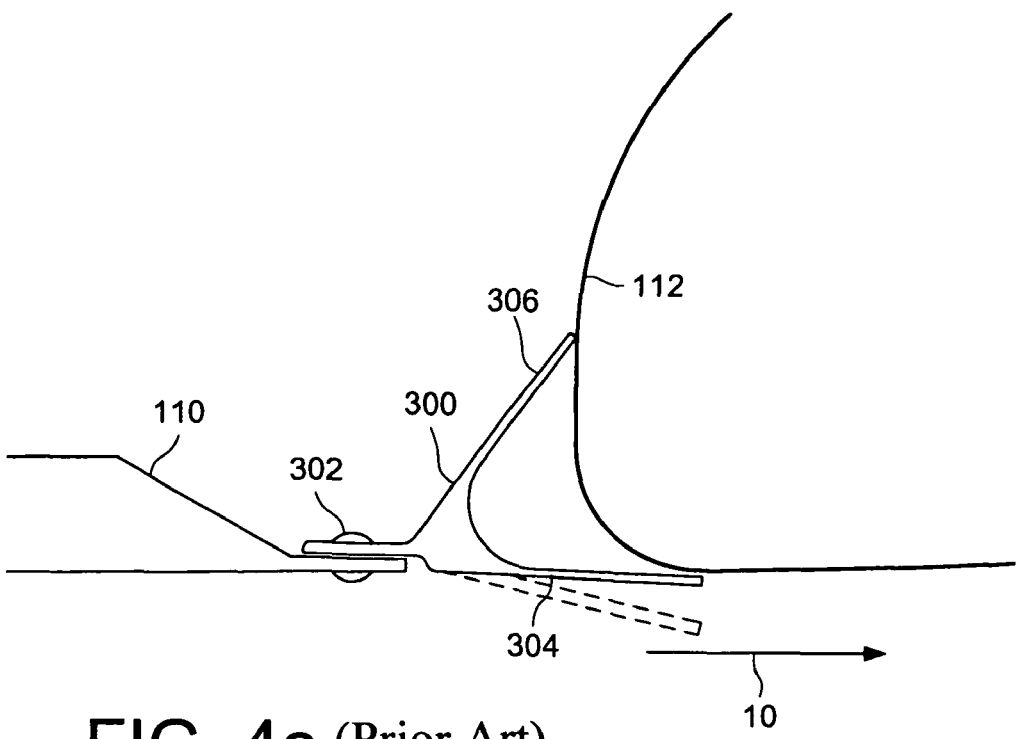
FIG. 4c is a side section view of the flap seal of FIG. 4a,
FIG. 5a is a side section view of a flap seal in accordance with the present invention.

Referring to FIG. 4c, the legs 304, 306 act completely independently, and even when the second leg 306 is contacting the leading edge 112 of the flap 108, detachment and flutter of the first leg 304 is observed. Although the auxiliary sealing effect of the second leg 306 helps to reduce air ingress, the flutter action and disruption of the airstream 10 causes drag and other undesirable aerodynamic effects.

FIG. 5a shows a seal 500 according to the present invention. The seal 500 comprises an elastomeric body 502 constructed from elastomeric material (e.g. polyurethane or silicone). The body is similar in shape to the seal 300 comprising an attachment portion 504, a first leg 506 and a second leg 508, and a central portion 510 therebetween. The attachment portion 504 and the first leg 506 are substantially planar, parallel and joined by the central portion 510. The second leg 508 projects at an angle A from the central portion 510 generally in the same direction as the first leg 506. The seal 500 therefore forms a lambda "λ" shape.

At the end of the second leg 508 furthest from the central portion 510 there are positioned three anti-stiction ribs 512 facing the first leg 506. The ribs 512 are designed to present a small contact area to the leading edge of the flap to avoid the second leg 508 catching on the flap by virtue of static friction (stiction).

The seal 500 further comprises a first insert 514 and a second insert 516. The inserts 514, 516 taper along the trailing edge of the wing as the seal tapers to match the wing geometry and kinematics. The inserts 514, 516 are constructed from a resilient material such as a carbon fibre reinforced polymer (CFRP).

The first insert 514 comprises an attachment portion 518, curved section 520 and a first shear portion 522. Referring to FIG. 5b the curved portion is wavelike and comprises a first arcuate section with radius R1 and a second arcuate section with radius R2 leading into the first shear portion 522 with radius R3.

The second insert 516 comprises a first planar portion 524 and a second planar portion 526 within the first and second legs 506, 508 respectively. The planar portions 524, 526 are joined by an arcuate second shear portion 528 with radius R4. R3 and R4 share the same origin O. As such the shortest distance between the shear portions 522, 528 is constant to define a generally arcuate shear seal portion 529.

Figure 5C:
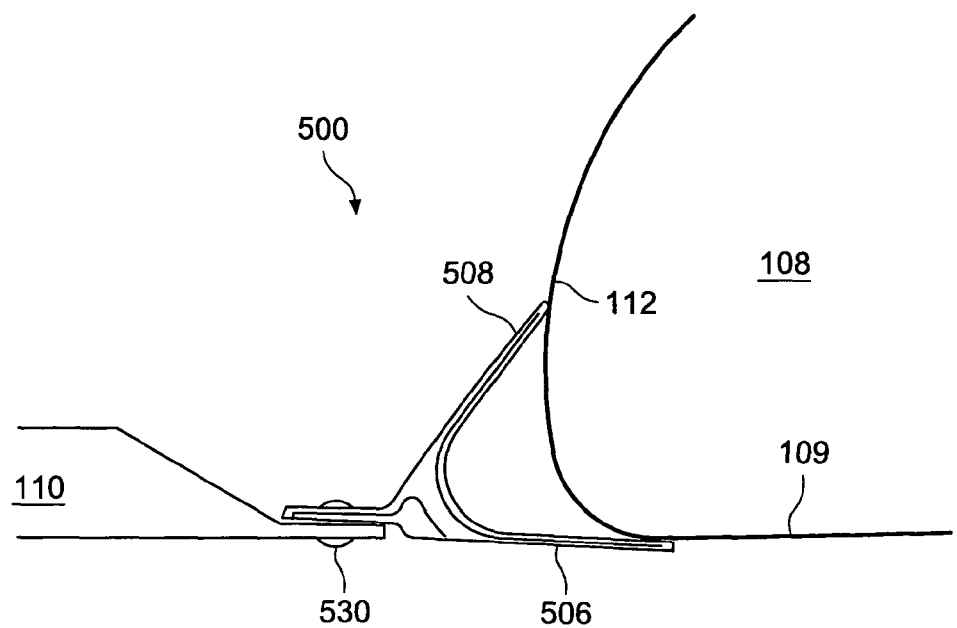
FIG. 5b is a side section view of a part of the flap seal of FIG. 5a,
FIG. 5c is a side section view of the flap seal of FIG. 5a in an undeformed state.
FIG. 5d is a side section view of the flap seal of FIG. 5a in a deformed state.
FIG. 5e is a perspective view of the flap seal of FIG. 5a,
FIG. 5f is a side section view of the flap seal of FIG. 5a along F-F in FIG. 5e, and,
FIG. 5g is a side section view of a part of the flap seal of FIG. 5a in the region G of FIG. 5f.

Referring to FIG. 5c, the seal 500 is mounted to the trailing edge 110 with a fixing means 530 as will be described below. In the position of the seal 500 as shown in FIG. 5c, the first leg 506 abuts the surface 109 of the flap 108 and the second leg abuts the leading edge 112 of the flap 108.

Figure 5D:
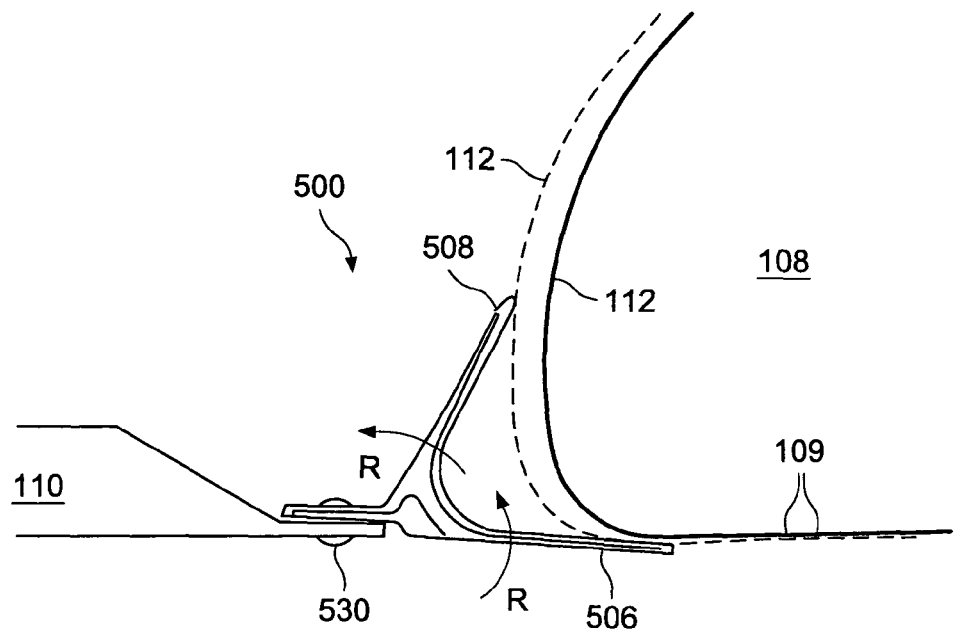

The second insert 516 links the first and second legs 506, 508 such that their motion is relatively constrained. As such, as the flap 108 pushes the second leg 508, the legs 506, 508 are urged anti-clockwise when viewing FIG. 5c and the first leg is pushed into firm engagement with the surface 109. This is shown in FIG. 5d when the flap 108 moves to the hidden line position, the first leg 506 is driven in direction R.

The stiffness of the seal 500 can be varied by altering the distance between the shear portions 522, 528. A shorter distance and/or a stiffer material will provide a stiffer hinge movement between the legs 506, 508 and the trailing edge 110 as the flap 108 bears against the seal 500.

Figure 5E:
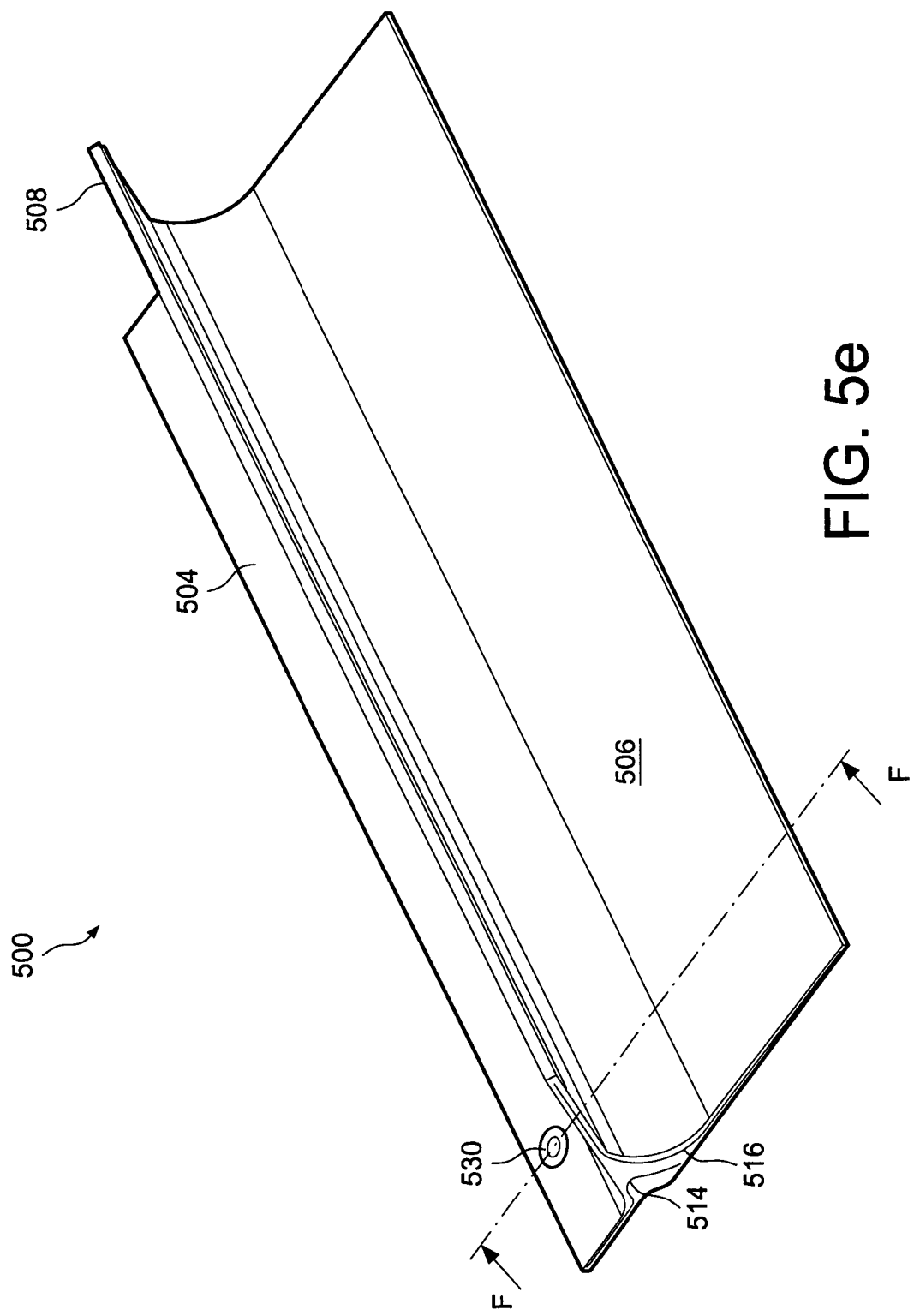

FIG. 5e shows the seal 500 with the fixing means 530. FIGS. 5f and 5g show the fixing means 530 in detail. The fixing means 530 comprises a washer 532 and a ferrule 534 which are embedded in the seal attachment region 504. The ferrule 534 passes through the attachment portion 518 of the first insert 514.

The ferrule 534 and washer 532 comprise an open bore 536 through which a bolt may be inserted to attach the seal 500 to the trailing edge 110 of the wing 104. It should be noted that the combined thickness of the ferrule 534 and washer 532 is approximately 87 percent of the thickness of the seal 504. Therefore when the ferrule 534 and washer 532 are fastened to the edge 110 with a bolt, the ferrule and washer are urged together to compress and clamp the seal attachment region 504 in place.

The seal 500 is manufactured by providing a seal mould in the shape of the seal outer, positioning the first insert 514 and the second insert 516 within the mould, injecting a liquid sealing material into the mould to surround the insert and curing the sealing material. Finally the seal 500 is removed from the mould once the sealing material us cured.

The following variations of the above embodiment fall within the scope of the present invention.

The seal may be made from any appropriate flexible sealing material. The inserts may be made from any appropriate stiffening material, as long as it is stiffer than the sealing material.

The inserts may contain bores to encourage bonding to the seal material during manufacture of the seal.

Externally applied (e.g. bonded) stiffening members may be used instead of inserts.

As such the shortest distance between the shear portions 522, 528 can be variable to create the desired seal behaviour.

The invention claimed is:

1. A flight surface assembly for an aircraft, said assembly comprising:
    a first flight surface component;
    a second flight surface component; and
    a seal for sealing a gap between said first and second components, the seal having a seal body comprising:
    a mounting portion for mounting to the first component,
    a first leg,
    a second leg projecting from the mounting portion and spaced apart from said first leg to receive the second component therebetween, and
    a first unitary stiffening member, said stiffening member comprising first and second stiffening arms, said arms are joined and associated with said first and second legs, respectively, and configured to at least partially constrain the relative motion of the first and second legs.

2. A flight surface assembly according to claim 1 in which the stiffening member is unitary and comprises said first stiffening arm and said second stiffening arm, in which the first stiffening arm is in or near the first leg and the second stiffening arm is in or near the second leg such that the relative motion of the first and second legs is at least partially constrained by the unitary stiffening member.

3. A flight surface assembly according to claim 2 in which the first and second stiffening arms are generally planar and joined by a first arcuate portion.

4. A flight surface assembly according to claim 3, further including a second stiffening member, said second member comprising a portion associated with said mounting portion of said seal body and a second arcuate portion associated with and spaced apart from the first arcuate portion of said first stiffening member to define a generally arcuate shear portion within the seal body.

5. A flight surface assembly according to claim 1 comprising a second stiffening member located proximate the mounting portion, in which the first stiffening member and the second stiffening member are separated by a shear portion of the seal body.

6. A flight surface assembly according to claim 5 in which the second stiffening member comprises a mounting portion for mounting to the first component.

7. A flight surface assembly according to claim 1 in which the first leg is arranged to project parallel to the first component, the second leg is arranged to project at an angle to the first leg and the second leg defines at least one protrusion positioned to contact the second component.

8. A flight surface assembly according to claim 1 in which the first and/or second stiffening member is constructed from CFRP.

9. A flight surface assembly according to claim 1 in which the first and/or second stiffening member is at least partially embedded within the seal body.

10. A flight surface assembly according to claim 9 in which the first and/or second stiffening member is fully embedded within the seal body.

11. A method of manufacture of a seal for an aircraft flight surface assembly, wherein said assembly includes the seal, a first flight surface component and a second flight surface component, said method comprising the steps of:
  providing a mould including a mould for said seal including a mounting member, a first leg and a second leg,
  providing a first stiffening member within the mould, said stiffening member comprising first and second stiffening arms, said arms are unitary, joined to and associated with said first and second legs, respectively;
  inserting a sealing material into the mould to at least partially surround the first and second arms of said stiffening member,
  curing the sealing material,
  removing the seal from the mould and mounting the mounting member portion of said seal on one of said flight surface components so as to seal a gap between said first and second flight surface components.

* * * * *